(12) United States Patent
Kasuga et al.

(10) Patent No.: US 7,959,534 B2
(45) Date of Patent: Jun. 14, 2011

(54) HYBRID DRIVING APPARATUS WITH MULTISTAGE TRANSMISSION PROVIDED IN POWER TRANSMISSION PATH AND CONTROL METHOD THEREOF

(75) Inventors: Shinji Kasuga, Anjo (JP); Yutaka Taga, Aichi-gun (JP); Daiki Suyama, Okazaki (JP); Yoshiyuki Onozawa, Hachioji (JP)

(73) Assignees: Toyota Jidosha Kabushiki Kaisha, Toyota-shi (JP); Aisin Aw Co., Ltd., Anjo-shi (JP)

( * ) Notice: Subject to any disclaimer, the term of this patent is extended or adjusted under 35 U.S.C. 154(b) by 683 days.

(21) Appl. No.: 12/081,069

(22) Filed: Apr. 10, 2008

(65) Prior Publication Data
US 2008/0254935 A1    Oct. 16, 2008

(30) Foreign Application Priority Data

Apr. 13, 2007 (JP) .................. 2007-105906

(51) Int. Cl.
| | |
|---|---|
| *B60K 1/02* | (2006.01) |
| *B60K 6/445* | (2006.01) |
| *B60K 20/00* | (2006.01) |
| *H02P 1/00* | (2006.01) |
| *H02P 3/00* | (2006.01) |
| *H02P 7/00* | (2006.01) |

(52) U.S. Cl. ...... 477/3; 477/7; 180/65.235; 180/65.265; 180/65.285; 903/930

(58) Field of Classification Search .................. 477/3, 7, 477/15; 180/65.1, 65.21, 65.24, 65.235, 180/65.265, 65.28, 65.285, 65.31; 903/930; 475/5, 9

See application file for complete search history.

(56) References Cited

U.S. PATENT DOCUMENTS

| | | | |
|---|---|---|---|
| 6,292,734 B1 | 9/2001 | Murakami et al. | |
| 6,726,592 B2 * | 4/2004 | Kotani | 477/4 |
| 7,434,641 B2 * | 10/2008 | Takami et al. | 180/65.25 |
| 7,575,079 B2 * | 8/2009 | Minamikawa | 180/65.285 |
| 7,828,093 B2 * | 11/2010 | Hanada et al. | 180/65.265 |
| 2003/0151381 A1 | 8/2003 | Kadota et al. | |
| 2009/0018715 A1 * | 1/2009 | Kanayama | 701/22 |

FOREIGN PATENT DOCUMENTS

| | | |
|---|---|---|
| JP | 07-186753 A | 7/1995 |
| JP | 10-250395 A | 9/1998 |
| JP | 10-272913 A | 10/1998 |
| JP | 2000-343982 A | 12/2000 |
| JP | 2003-209902 A | 7/2003 |
| JP | 2005-029118 A | 2/2005 |
| JP | 2005-313865 A | 11/2005 |

* cited by examiner

*Primary Examiner* — Tisha D Lewis
(74) *Attorney, Agent, or Firm* — Kenyon & Kenyon LLP

(57) ABSTRACT

When a sub transmission mechanism is switched to the LO-side gear stage, a hybrid control unit executes a control operation such that vehicle speed does not exceed limit vehicle speed determined in advance in accordance with the transmission gear ratio of LO-side gear stage. Specifically, the hybrid control unit reduces at least one of the driving torque generated by the engine and the second motor generator, so that rotation speed of the second motor generator does not exceed tolerable rotation speed. Further, the hybrid control unit reduces at least one of the driving torque generated by the engine and the second motor generator when any of temperatures respectively detected by temperature sensors exceed corresponding upper limit temperatures.

9 Claims, 6 Drawing Sheets

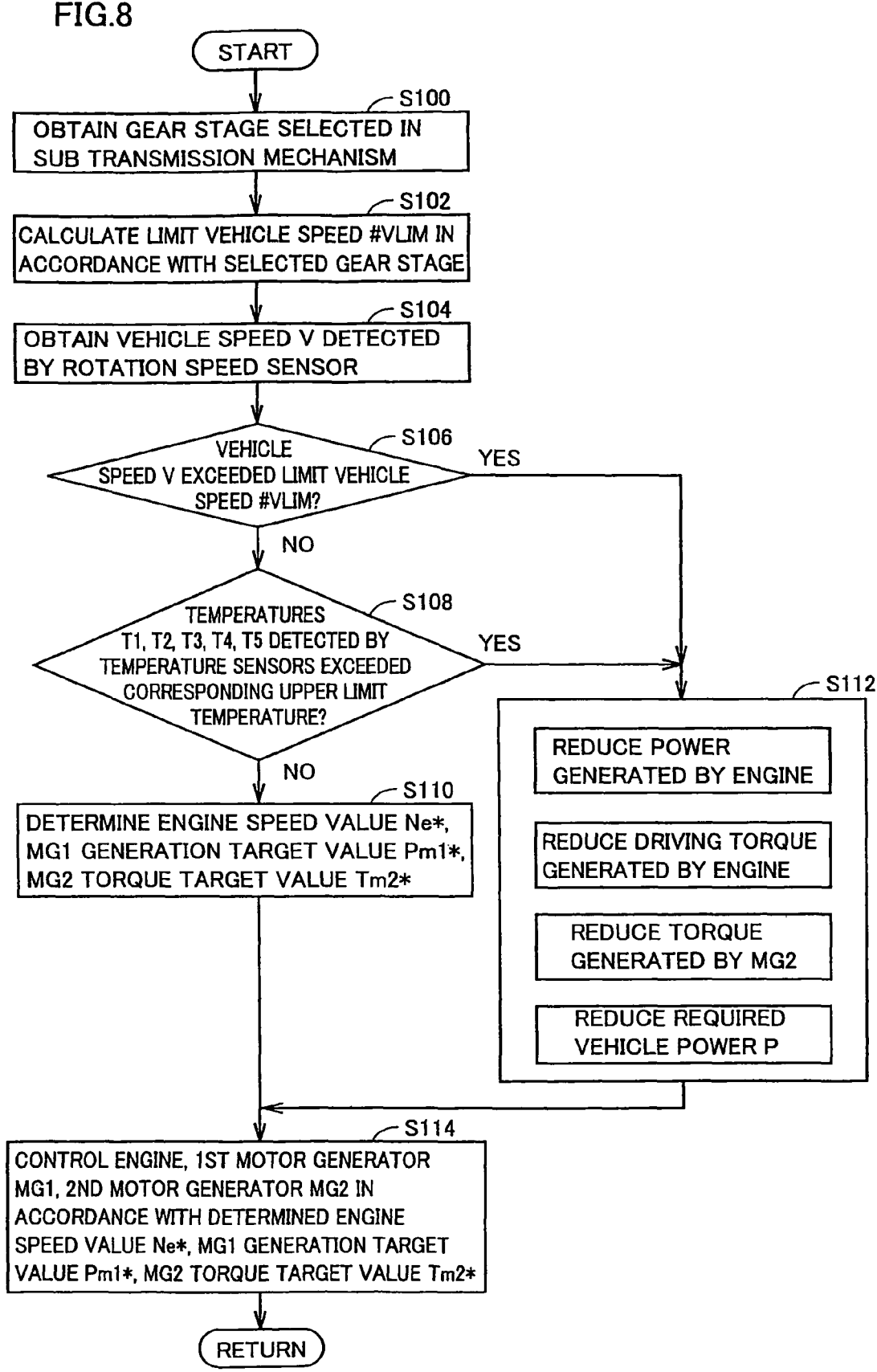

HYBRID DRIVING APPARATUS WITH MULTISTAGE TRANSMISSION PROVIDED IN POWER TRANSMISSION PATH AND CONTROL METHOD THEREOF

This nonprovisional application is based on Japanese Patent Application No. 2007-105906 filed with the Japan Patent Office on Apr. 13, 2007, the entire contents of which are hereby incorporated by reference.

BACKGROUND OF THE INVENTION

1. Field of the Invention

The present invention relates to a hybrid driving apparatus including, in its power transmission path, a transmission mechanism with a plurality of selectable transmission stages such as a transfer device, as well as to a method of controlling the same.

2. Description of the Background Art

Recently, a hybrid vehicle mounting a hybrid driving apparatus having an engine and an electric motor as power sources has come to be practically used to attain higher fuel consumption efficiency. In such a hybrid vehicle, an electric motor and/or a generator mechanically coupled to the engine is appropriately controlled such that engine operation is adjusted to an optimal operation point, thereby to attain improved fuel consumption efficiency. Specifically, when viewed from the engine, the electric motor and/or generator constitutes a kind of continuously variable transmission (CVT). As a result, the engine can operate while maintaining one same operation point, independent of the speed of hybrid vehicle.

Conventionally, a vehicle mounted with a transfer device has been known, which allows switching to a low-speed side transmission stage in accordance with driving operation, to coop with a situation requiring larger driving torque such as traveling on rough road or towing. By way of example, Japanese Patent Laying-Open No. 10-250395 discloses a transfer device in which a changeover mechanism is set to a low-speed side by an operation of a transfer selector lever from high speed to low speed position, so that speed of rotation of an output shaft of transmission is reduced and transmitted for driving to the front and rear wheels, through a planetary gear mechanism.

By installing such a transfer device in the hybrid vehicle described above, higher driving torque can be generated. Here, if the transfer device is switched to the low-speed side, that is, to a larger transmission gear ratio, speed of rotation of the electric motor and the like increases because of the switching in transmission gear ratio, even if the vehicle travels at the same speed. On the other hand, the optimal operation point of the engine is maintained regardless of the switching of transfer device.

Therefore, even if the transfer device is switched to the low-speed side, engine sound or vibration associated with the engine operation hardly increases. As a result, it might be often the case that the driver is unaware that the vehicle is traveling with the low-speed side gear stage. It is possible that driving continues for a long period of time while the transfer device is kept set to the low-speed side transmission stage. It is concerned that the speed of rotation of electric motor might exceed tolerable rotation speed, or there might be excessive load on the electric motor or a power converter supplying electric power to the electric motor.

SUMMARY OF THE INVENTION

The present invention was made to solve such a problem, and its object is to provide a hybrid driving apparatus capable of protecting portions generating driving force even when transmission stage is switched to a low-speed side, and to provide a method of controlling the same.

According to an aspect, the present invention provides a hybrid driving apparatus, including a power source, a generator, a power distributing mechanism, a first transmission mechanism, an electric motor, a vehicle speed obtaining unit for obtaining vehicle speed, and a controller controlling operations of the power source, the generator and the electric motor. The power distributing mechanism distributes at least a part of power from the power source to the generator and distributes remaining part to a rotation output shaft. The first transmission mechanism is arranged in a power transmission path from the rotation output shaft to driving wheels, and it is capable of selecting a normal transmission stage used for normal traveling and at least one low-speed side transmission stage set to a transmission gear ratio larger than the normal transmission stage, in accordance with a driver's operation. The electric motor is connected to the power transmission path between the power distributing mechanism and the first transmission mechanism, and generates driving force using electric power. When the low-speed side transmission stage is selected in the first transmission mechanism, the controller executes a control operation such that the vehicle speed does not exceed a limit vehicle speed determined in advance in correspondence with transmission gear ratio of the low-speed side transmission stage.

Preferably, the limit vehicle speed is determined based on tolerable rotation speed of the electric motor.

Preferably, the controller compares magnitude relation between the vehicle speed and the limit vehicle speed and when vehicle speed exceeds the limit vehicle speed, reduces at least one of driving torque generated by the electric motor and the power source.

Preferably, the hybrid driving apparatus further includes a temperature obtaining unit obtaining temperature of the electric motor, and the controller compares magnitude relation between the temperature of the electric motor and a predetermined threshold value, and when temperature of the electric motor exceeds the threshold value, reduces at least one of driving torque generated by the electric motor and the power source.

Preferably, the controller determines a required output value to be transmitted to the driving wheels at least in accordance with vehicle speed, and determines operation target value of each of the power source, the generator and the electric motor in accordance with the required output value, and magnitude of the required output value decreases as the vehicle speed comes closer to the limit vehicle speed.

Preferably, the controller determines a required output value to be transmitted to the driving wheels at least in accordance with vehicle speed, and determines operation target value of each of the power source, the generator and the electric motor in accordance with the required output value, and magnitude of the required output value decreases as the temperature of the electric motor comes closer to a predetermined threshold value.

Preferably, the hybrid driving apparatus further includes a second transmission mechanism having a plurality of transmission stages, arranged in the power transmission path from the rotation output shaft to the first transmission mechanism.

Preferably, the hybrid driving apparatus further includes a warning light for providing a warning indication to the driver, and when a state in which the vehicle speed is close to the limit vehicle speed continues, the controller turns on the warning light.

According to another aspect, the present invention provides a method of controlling a hybrid driving apparatus. The hybrid driving apparatus includes a power source, a generator, a power distributing mechanism, a first transmission mechanism, and an electric motor. The power distributing mechanism distributes at least a part of power from the power source to the generator and distributes remaining part to a rotation output shaft. The first transmission mechanism is arranged in a power transmission path from the rotation output shaft to driving wheels. The electric motor is connected to the power transmission path between the power distributing mechanism and the first transmission mechanism, and generates driving force using electric power. The first transmission mechanism is capable of selecting a normal transmission stage used for normal traveling and at least one low-speed side transmission stage set to a transmission gear ratio larger that the normal transmission stage, in accordance with a driving operation. The control method includes the steps of obtaining vehicle speed and, when the low-speed side transmission stage is selected in the first transmission mechanism, controlling operations of the power source, the generator and the electric motor such that the vehicle speed does not exceed a limit vehicle speed determined in advance in correspondence with transmission gear ratio of the low-speed side transmission stage.

The present invention realizes a hybrid driving apparatus and control method thereof that can protect portions generating driving force even when the transmission stage is switched to the low-speed side.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flowchart representing process steps of the vehicle speed limiting operation in accordance with the embodiment of the present invention.

DESCRIPTION OF THE PREFERRED EMBODIMENTS

Figure 1:
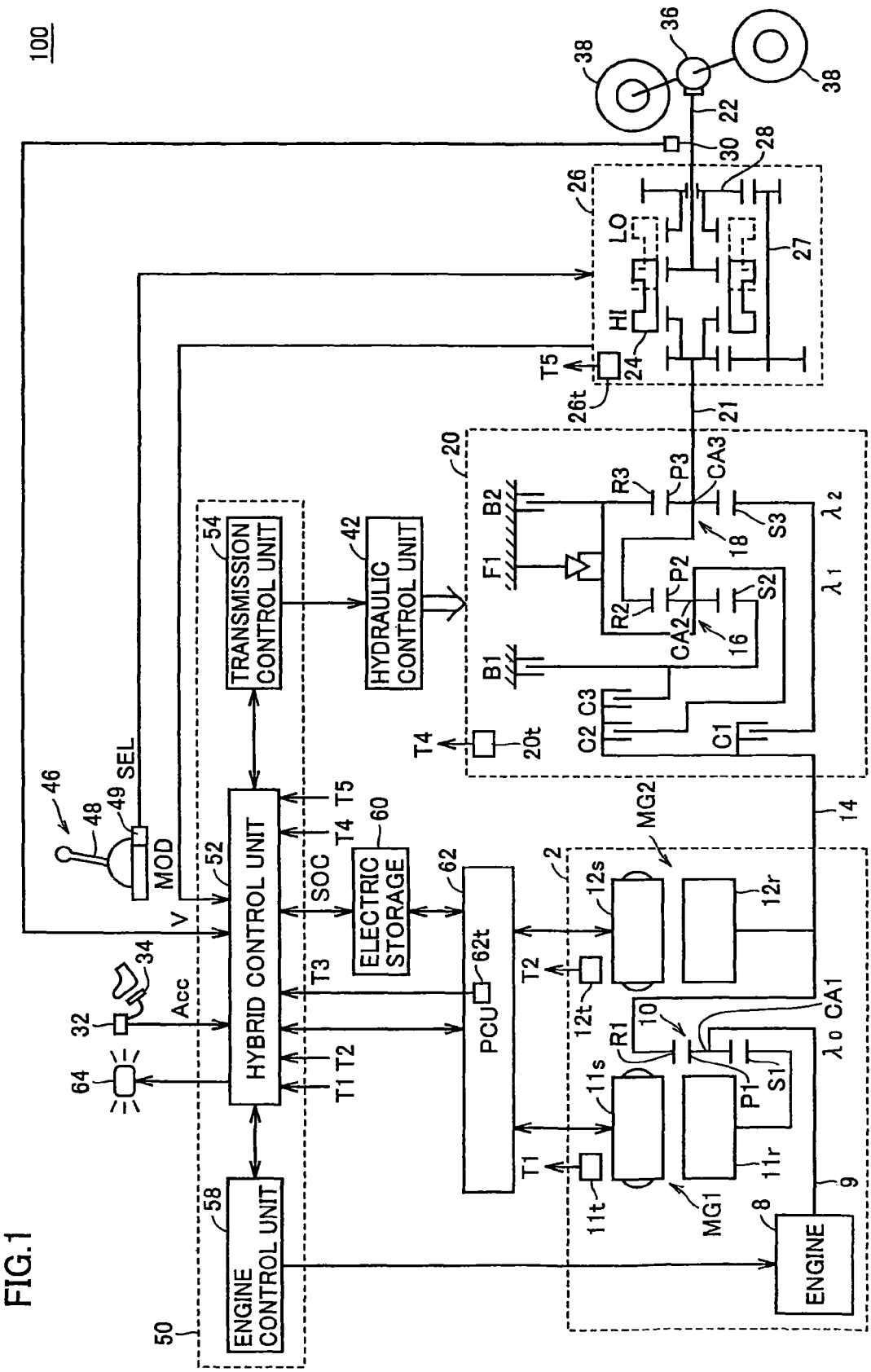
FIG. 1 schematically shows a configuration of a hybrid driving apparatus in accordance with an embodiment of the present invention.

An embodiment of the present invention will be described in detail with reference to the figures. In the figures, the same or corresponding portions are denoted by the same reference characters and description thereof will not be repeated.

(Overall Configuration of Hybrid Driving Apparatus)

Referring to FIG. 1, a hybrid driving apparatus 100 in accordance with an embodiment of the present invention includes a power unit 2, a main transmission mechanism 20, a sub transmission mechanism 26, a rotation driving shaft 22, a differential gear 36, and driving wheels 38. Hybrid driving apparatus 100 is particularly suitable for an FR (Front engine Rear drive) vehicle.

It is noted that portions other than engine 8 of power unit 2 and sub transmission mechanism 26 are formed in symmetry with respect to the shaft center. In FIG. 1, portions representing power unit 2 and main transmission mechanism 20 on the lower side are not described.

Hybrid driving apparatus 100 further includes an electric storage 60, a power control unit (PCU) 62, a controller 50, a hydraulic control circuit 42, a transmission mode switching device 46, an accelerator pedal 34, a rotation speed sensor 30, temperature sensors 11$t$, 12$t$, 20$t$, 26$t$, and 62$t$, and a warning light 64. Controller 50 includes an engine control unit 58, a transmission control unit 54, and a hybrid control unit 52.

Power unit 2 includes an engine 8 as a representative example of power source, a first motor generator MG1, a second motor generator MG2, and a first planetary gear mechanism 10 as a power distributing mechanism. Power unit 2 generates driving force (driving torque), and outputs the generated driving torque through a rotation output shaft 14 (in other words, an output shaft of second motor generator MG2) to main transmission mechanism 20.

Main transmission mechanism 20 is provided in a power transmission path between power unit 2 and intermediate rotation shaft 21, and it is implemented, for example, by a stepped automatic transmission (AT). Specifically, main transmission mechanism 20 is capable of selectively providing one of a plurality of transmission stages (transmission gear ratios) between rotation output shaft 14 and intermediate rotation shaft 21.

Sub transmission mechanism 26 is typically positioned between intermediate rotation shaft 21 and a rotation driving shaft 22 and, in response to a switching signal SEL generated by a driver operating a transmission mode switching device 46, selectively provides a normal transmission stage (hereinafter also denoted as "HI-side gear stage") used for normal travel, or a low-speed side transmission stage (hereinafter also denoted as "LO-side gear stage") set to a larger transmission gear ratio than the normal transmission stage. Sub transmission mechanism 26 is typically implemented by a transfer device. Further, sub transmission device 26 outputs a selection state signal MOD indicating the gear stage that is being selected to hybrid control unit 52. In the present embodiment, sub transmission mechanism 26 having one low-side transmission stage will be described as an example. A sub transmission mechanism having two or more low-side transmission stages may be used.

As described above, in hybrid driving apparatus 100 in accordance with the present embodiment, in the power transmission path from rotation output shaft 14 of power unit 2 to the driving wheels 38, main transmission mechanism 20 and sub transmission mechanism 26 are arranged in series. Therefore, rotation output shaft 14 of power unit 2 is mechanically coupled to driving wheels 38 with the transmission gear ratio provided by each of the main transmission mechanism 20 and sub transmission mechanism 26.

Rotation driving shaft 22 as the output shaft of sub transmission mechanism 26 is coupled to driving wheels 28 through differential gear 36, and transmits driving torque output from power unit 2 to driving wheels 38.

Electric storage 60 is a rechargeable DC power source, such as a nickel hydride or lithium ion secondary battery.

Electric storage 60 supplies electric power to power control unit 62, and is also charged by receiving the regenerated power output from power control unit 62. A large capacity capacitor may be used as electric storage 60.

Power control unit 62 converts DC power from electric storage 60 to AC power in accordance with a driving signal from controller 50, and outputs the AC power to respective stators 11s and 12s of motor generators MG1 and MG2. Further, in accordance with a driving signal from controller 50, power control unit 62 converts AC power provided by regenerative operation of motor generators MG1 and MG2 to DC power and outputs to electric storage 60. Power control unit 62 typically converts AC power to/from DC power alternately, by way of switching operation of a semiconductor switching element.

In accordance with a hydraulic control command from controller 50, hydraulic control circuit 42 engages/disengages a frictional engagement element (typically, a clutch or a brake) in main transmission mechanism 20 using hydraulic pressure, and implements transmission operation in main transmission mechanism 20.

Transmission mode switching device 46 includes a switching lever 48 and a position sensor 49. Switching lever 48 is for the driver to select one of "HI-side gear stage" and "LO-side gear stage". Position sensor 49 outputs a switching signal SEL representing the gear stage selected by switching lever 48 to sub transmission mechanism 26. In place of position sensor 49, a wire or the like may be used to couple switching lever 48 and sub transmission mechanism 26 allowing linked operation, so that the switching operation is implemented by mechanical movement caused by the operation of switching lever 48. Further, a "neutral (N)" position may be provided, at which the transmission is not set to any specific stage.

Further, an open-position sensor 32 is coupled to accelerator pedal 34, and open position sensor 32 outputs a signal indicating accelerator position Acc corresponding to the operation of accelerator pedal 34 by the driver to controller 50 (hybrid control unit 52).

Rotation speed sensor 30 detects rotation speed of rotation driving shaft 22, and from the detected value, outputs a signal indicating vehicle speed V to controller 50 (hybrid control unit 52). In the present specification, the rotation speed represents the number of rotations per unit time (for example, per 1 minute).

Temperature sensor 11t mainly detects temperature T1 of stator 11s of first motor generator MG1, and outputs a signal indicating the temperature to controller 50 (hybrid control unit 52). Similarly, temperature sensor 12t mainly detects temperature T2 of stator 12s of second motor generator MG2, and outputs a signal indicating temperature T2 to controller 50 (hybrid control unit 52). Further, temperature sensor 62t detects temperature T3 of semiconductor switching element or the like in power control unit 62, and outputs a signal indicating temperature T3 to controller 50 (hybrid control unit 52).

Further, temperature sensor 20t detects temperature of ATF (Automatic Transmission Fluid), not shown, of main transmission mechanism 20, and outputs a signal indicating temperature T4 of the ATF to controller 50 (hybrid control unit 52). Similarly, temperature sensor 26t detects temperature of ATF in sub transmission mechanism 26, and outputs a signal indicating temperature T5 of the ATF to controller 50 (hybrid control unit 52). Here, ATF is oil or grease for cooling or lubricating main transmission mechanism 20 and sub transmission mechanism 26.

Engine control unit 58 controls start/stop of engine 8 and controls rotation speed when it is in operation, in accordance with an engine rotation speed target value from hybrid control unit 52. Transmission control unit 54 executes transmission control of main transmission mechanism 20. Specifically, transmission control unit 54 determines transmission stage (gear stage) of main transmission mechanism 20 in accordance with the state of traveling, and outputs to hydraulic control circuit 42 a command for engaging or disengaging each frictional engagement element in main transmission mechanism 20 so that the determined gear stage is set in the main transmission mechanism 20.

Based on vehicle speed V, accelerator position Acc, selection state signal MOD, value of State Of Charge (SOC) of electric storage 60 and signals from various sensors, not shown, hybrid control unit 52 executes control operation for power unit 2, and outputs a control signal according to the result of operation, to engine control unit 58 and power control unit 62.

Particularly, hybrid control unit 52 in accordance with the present embodiment executes control operation such that when sub transmission mechanism 26 is switched to the LO-side gear stage, the vehicle speed does not exceed a limit vehicle speed determined in advance in accordance with the transmission gear ratio of the LO-side gear stage. Specifically, hybrid control unit 52 reduces at least one of driving torque generated by engine 8 and motor generator MG2, so that the speed of rotation of second motor generator MG2 does not exceed a tolerable rotation speed. Further, such a reduction operation (vehicle speed limiting operation) is also executed when rotation speed of each gear in first planetary gear mechanism 10 or main transmission mechanism 20 is expected to exceed corresponding tolerable rotation speed.

Further, hybrid control unit 52 reduces at least one of driving torque generated by engine 8 and motor generator MG2 when any of temperatures T1, T2, T3, T4 and T5 respectively detected by temperature sensors 11t, 12t, 62t, 20t, and 26t exceed corresponding upper limit temperatures.

Alternatively, in place of or in addition to the operation of reducing driving torque, hybrid control unit 52 may reduce the output (power) of engine 8.

By such a control operation, hybrid control unit 52 protects second motor generator MG2, power control unit 62 and the like, even when sub transmission mechanism 26 is switched to LO-side gear stage.

(Configuration of Power Unit)

Engine output shaft 9 is a rotating member arranged on a prescribed shaft axis in a transmission case (not shown) as a non-rotating member fixed on the vehicle body. First planetary gear mechanism 10 is an output splitting mechanism coupled to an engine output shaft 9. Engine 8 generates power by combustion of fuel, and typically it is implemented by a gasoline engine or a diesel engine. A pulsation absorbing dumper may be inserted between engine 8 and first planetary gear mechanism 10.

First planetary gear mechanism 10 of single-pinion type constitutes a power distribution mechanism mechanically distributing power generated by engine 8, and operates as a differential mechanism distributing the output of engine 8 to first motor generator MG1 and rotation output shaft 14. Specifically, first planetary gear mechanism 10 includes a first sun gear S1, a first planetary gear P1, a first carrier CA1 supporting first planetary gear P1 allowing rotation and revolution, and a first ring gear R1 that engages with first sun gear S1 with first planetary gear P1 interposed, as rotation elements.

In first planetary gear mechanism 10, first carrier CA1 is coupled to engine output shaft 9, that is, engine 8, first sun gear S1 is coupled to rotor 11r of first motor generator MG1, and first ring gear R1 is coupled to the rotation output shaft 14. The three elements of planetary gear mechanism, that is, first sun gear S1, first carrier CA1 and first ring gear R1 rotate relative to each other.

Thus, receiving at least a part of the power generated by engine 8, first motor generator MG1 generates electric power and charges electric storage 60 and, remaining part of the power generated by engine 8 is transmitted through first ring gear R1 to rotation output shaft 14.

Second motor generator MG2 has a rotor 12r that rotates integrally with rotation output shaft 14. Therefore, to the driving torque generated by second motor generator MG2 using the electric power from electric storage 60, the driving force from engine 8 input through first ring gear R1 of first planetary gear mechanism 10 is added and transmitted to driving wheels 38.

In this manner, first planetary gear mechanism 10 functions as an electrical differential device and power unit 2 can change rotation speed of engine 8 and rotation speed of rotation output shaft 14, as needed. Specifically, power unit 2 functions as an electric continuously variable transmission that can continuously vary (rotation speed of engine output shaft 9)/(rotation speed of rotation output shaft 14).

(Configuration of Main Transmission Mechanism)

Main transmission mechanism 20 is arranged in a power transmission path between rotation output shaft 14 (output shaft of second motor generator MG2) and intermediate rotation shaft 21.

Main transmission mechanism 20 includes a single-pinion type second planetary gear mechanism 16 and a single-pinion type third planetary gear mechanism 18.

Second planetary gear mechanism 16 includes a second sun gear S2, a second planetary gear P2, a second carrier CA2 supporting second planetary gear P2 allowing rotation and revolution, and a second ring gear R2 that engages with second sun gear S2 with second planetary gear P2 interposed, as rotation elements. Third planetary gear mechanism 18 includes a third sun gear S3, a third planetary gear P3, a third carrier CA3 supporting third planetary gear P3 allowing rotation and revolution, and a third ring gear R3 that engages with third sun gear S3 with third planetary gear P3 interposed, as rotation elements.

Rotation output shaft 14 is selectively coupled to third sun gear S3 through a first clutch C1, second carrier CA2 through a second clutch C2 or second sun gear S2 through a third clutch C3, respectively.

Further, second sun gear S2 is selectively coupled to the case through a first brake B1. Second ring gear R2 and third carrier CA3 are integrally coupled to intermediate rotation shaft 21, and selectively coupled to the case through a second brake B2. Further, second carrier CA2 and third ring gear R3 are selectively coupled to the case through a one-directional clutch F1.

Here, clutches C1 to C3, brakes B1 and B2, and one-directional clutch F1 are hydraulic frictional engagement devices commonly used in general automatic transmission for vehicles. These are implemented by wet multiple-disk type device in which a plurality of friction plates superposed on each other are pressed by a hydraulic actuator, or a band brake in which one end of one or two bands wound around an outer circumference of a rotation drum is pulled by a hydraulic actuator, enabling selective coupling of members on opposite sides between which it is inserted.

(Configuration of Sub Transmission Mechanism)

Sub transmission mechanism 26 is arranged in the power transmission path between intermediate rotation shaft 21 and rotation driving shaft 22. In response to switching signal SEL, it selectively forms the HI-side gear stage used for normal traveling or the LO-side gear stage set to larger transmission gear ratio than the normal transmission stage.

More specifically, sub transmission mechanism 26 includes a sleeve 24 of which engagement position can selectively be changed in accordance with the selecting signal SEL, a counter shaft 27 that rotates engaged with intermediate rotation shaft 21, and a driven gear 28 that rotates engaged with counter shaft 27. When sleeve 24 is positioned on the left side in the figure, intermediate rotation shaft 21 and rotation driving shaft 22 are directly coupled through sleeve 24 and, therefore, HI-side gear stage having the transmission gear ratio of "1" is provided.

When sleeve 24 is positioned on the right side in the figure, intermediate rotation shaft 21 comes to be coupled with rotation driving shaft 22 through counter shaft 27, driven gear 28 and sleeve 24. Here, by appropriately designing the numbers of teeth of counter shaft 27 and sleeve 24, LO-side gear stage having a transmission gear ratio larger than "1" (for example, 2 or 3) can be provided.

The switching operation of sub transmission mechanism 26 is typically executed when the vehicle is in a stationary state, that is, when rotation driving shaft 22 is not rotating. The configuration allowing switching during travel may be adopted. In that case, it is desirable to inhibit switching of sub transmission mechanism 26 from the HI-side to the LO-side when at least one of speed and temperature exceeds the limiting condition.

(Vehicle Speed Limiting Operation When LO-side Gear is Selected)

Figure 2:
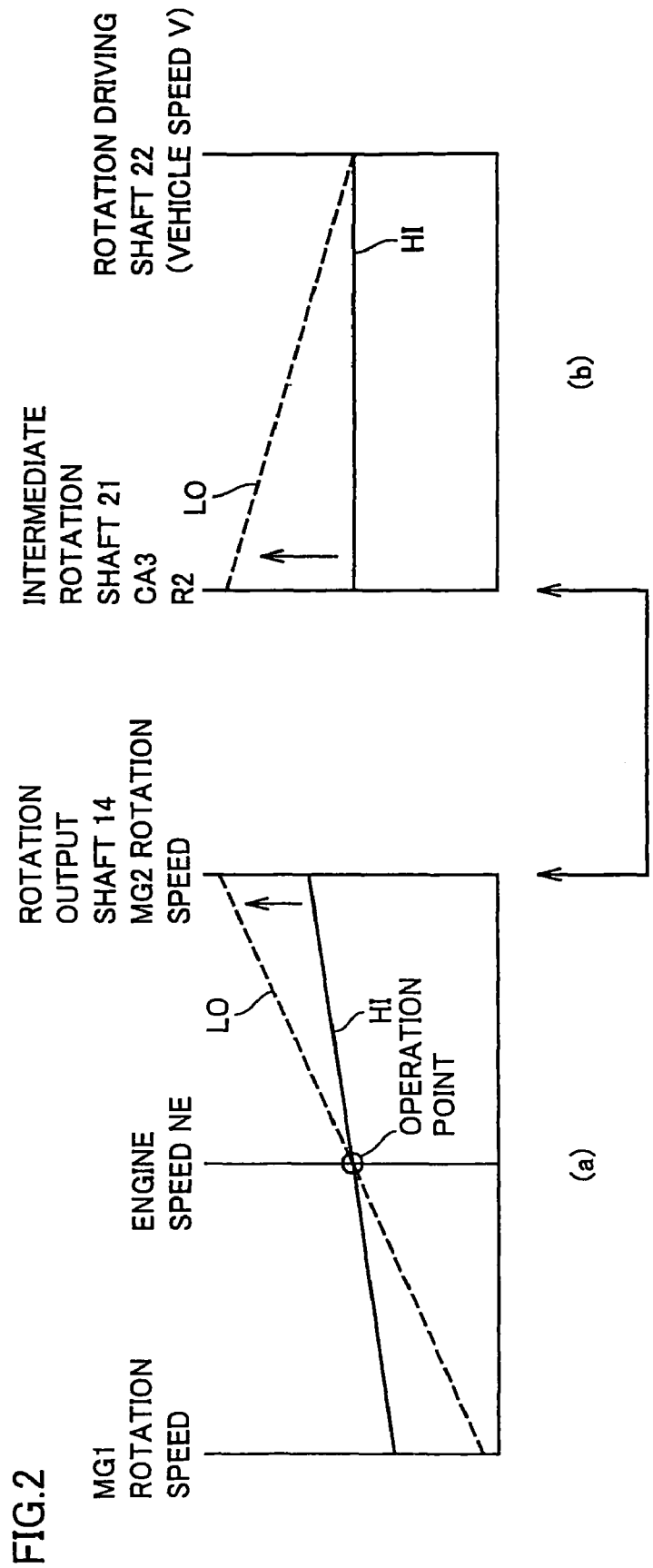
FIG. 2 is a nomographic chart representing speed of rotation of various portions related to the switching operation of a sub-transmission mechanism.

Referring to FIG. 2, rotation speed of various portions related to the switching operation of sub transmission mechanism 26 will be described in the following. FIG. 2 shows an example in which vehicle speed V is maintained at a prescribed value before and after the switching operation of sub transmission mechanism 26.

FIG. 2(a) shows the change in rotation speed of each rotation member in power unit 2. FIG. 2(b) shows the change in rotation speed of each rotation member in sub transmission mechanism 26.

Referring to FIG. 2(b), when HI-side gear is selected in sub transmission mechanism 26, the rotation speed of rotation driving shaft 22 is the same as the rotation speed of intermediate rotation shaft 2 1, as the transmission gear ratio is "1". When transmission mode switching device 46 is operated by the driver and sub transmission mechanism 26 is switched from HI-side gear stage to LO-side gear stage, the transmission gear ratio is set to a value larger than "1" and, therefore, the rotation speed of intermediate rotation shaft 21 comes to be higher than the rotation speed of rotation driving shaft 22.

Accordingly, assuming that the transmission stage selected in main transmission mechanism 20 is the same, the rotation speed of rotation output shaft 14, that is, the rotation speed of second motor generator MG2 comes to be higher than when HI-side gear stage is selected, as shown in FIG. 2(a).

Further, rotation speed of first motor generator MG1 lowers, so that engine 8 operates at approximately the same operation point as when HI-side gear stage is selected.

Therefore, when switching from HI-side gear stage to LO-side gear stage takes place in sub transmission mechanism 26, rotation speed of second motor generator MG2 becomes higher in accordance with the change in transmission gear ratio, while rotation speed of engine 8 is not changed before and after the switching operation. Therefore, when LO-side gear is selected, it is necessary to protect second motor generator MG2 not to exceed the tolerable rotation speed. Further, as the rotation speed of second motor generator MG2 is maintained at a relatively high value, it follows that second motor generator MG2 and power control unit 62 operate under heavy load, and amount of heat generated at respective portions increases. Protection against such heat is also necessary. Therefore, in hybrid driving apparatus 100 in accordance with the present embodiment, these portions are protected by executing the vehicle speed limiting operation as will be described in the following.

In the following, a configuration implementing such a vehicle speed limiting operation will be described with reference to FIGS. 3 to 6.

Figure 3:
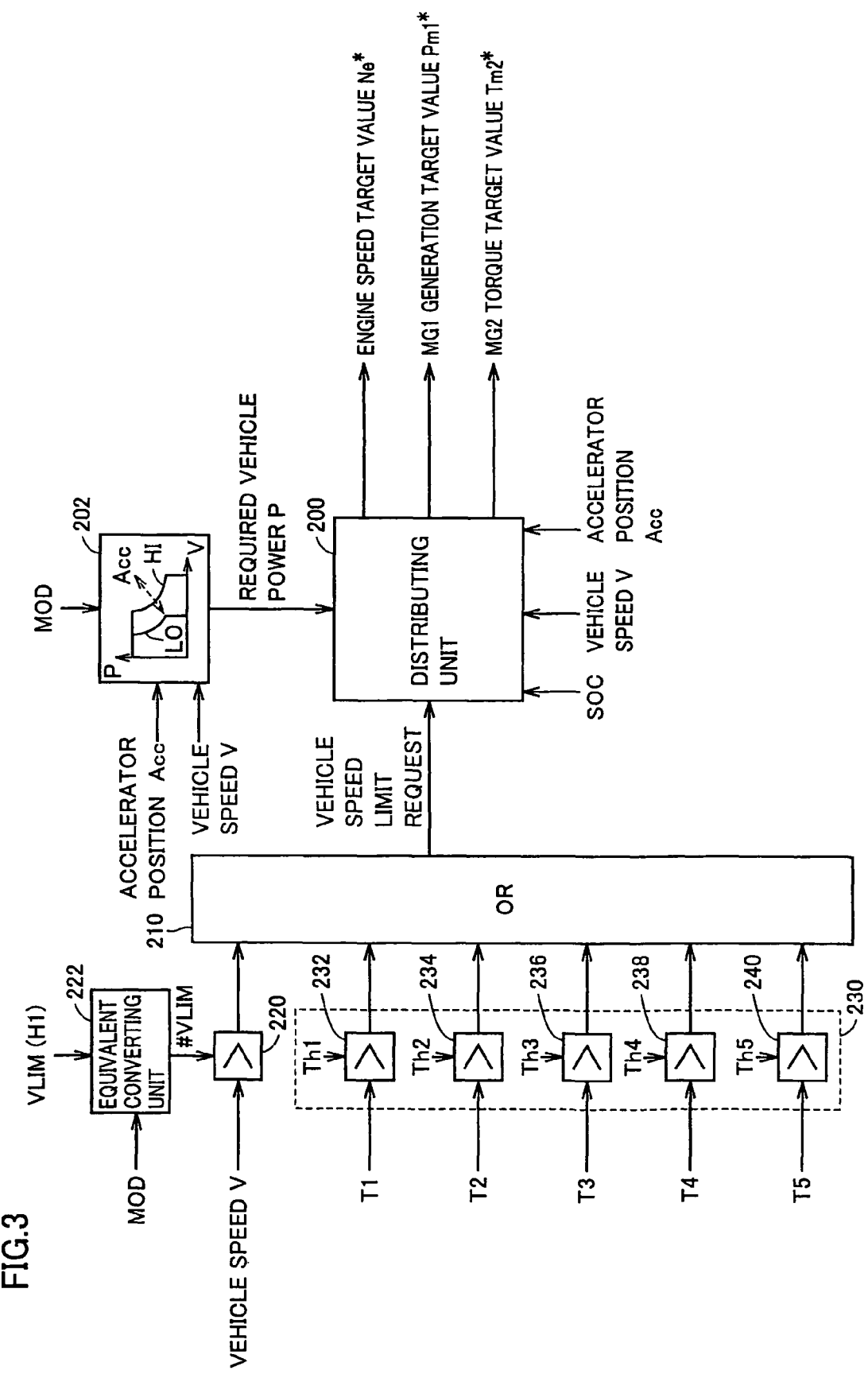
FIG. 3 is a functional block diagram for implementing a vehicle speed limiting operation in accordance with an embodiment of the present invention.

Referring to FIG. 3, the vehicle speed limiting operation in accordance with the present embodiment is mainly executed by hybrid control unit 52. Specifically, hybrid control unit 52 includes a distributing unit 200 and a required vehicle power determining unit 202.

In accordance with the required vehicle power P output from required vehicle power determining unit 202, distributing unit 200 determines operation target value of each of engine 8, first motor generator MG1 and second motor generator MG2, and thereby controls respective states of operations. Specifically, an engine speed target value Ne*, an MG1 generation target value Pm1* and an MG2 torque target value Tm2* are determined such that the sum of power generated by second motor generator MG2 and the power generated by engine 8 minus the power used for generation by first motor generator MG1 equals the required vehicle power P. In determining these target values, vehicle speed V, accelerator position Acc, SOC of electric storage 60 and the like are taken into consideration. Here, the engine speed target value Ne* is determined with priority to attain highest fuel consumption efficiency.

Engine speed target value Ne* determined by distributing unit 200 is passed to engine control unit 58 (FIG. 1), and engine control unit 58 controls speed of engine 8. Further, MG1 generation target value Pm1* and MG2 torque target value Tm2* are passed to power control unit 62 (FIG. 1), and power control unit 62 controls electric power sent/received to/from stators 11s and 12s of motor generators MG1 and MG2 respectively.

Here, required vehicle power determining unit 202 determines the required vehicle power based at least on the vehicle speed V and accelerator position Acc. Typically, required vehicle power determining unit 202 stores a map defining the required vehicle power in correspondence with the accelerator position Acc and vehicle speed V, and by looking up the map, it determines the required vehicle power P appropriate for the accelerator position and vehicle speed V at each time point.

Particularly, required vehicle power determining unit 202 in accordance with the present embodiment stores different maps corresponding to the LO-side gear stage and HI-side gear stage, and in accordance with the selection state signal MOD output from sub transmission mechanism 26, looks up the corresponding map and determines the required vehicle power P.

Figure 4:
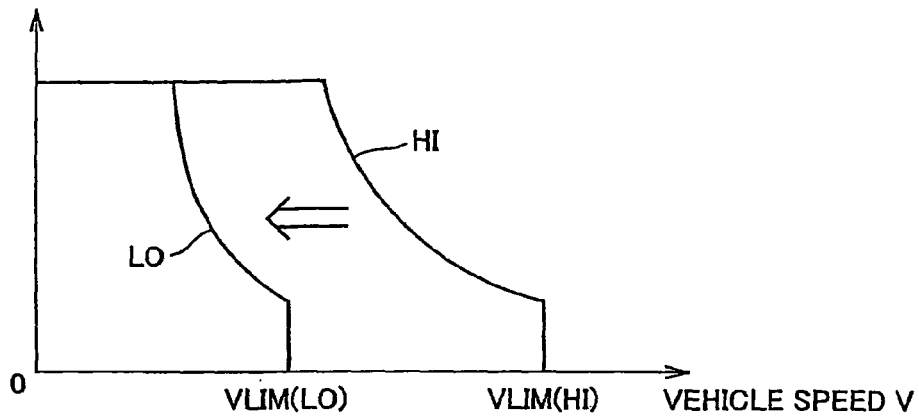
FIG. 4 shows an example of required vehicle power characteristic stored in a required vehicle power determining unit.

Referring to FIG. 4, required vehicle power determining unit 202 stores, separate for the LO-side gear stage and HI-side gear stage, respective maps defining required vehicle power P in correspondence with the vehicle speed V. Though required vehicle power P is defined also in correspondence with accelerator position Acc, FIG. 4 shows the characteristic of required vehicle power P with respect to vehicle speed V for a specific accelerator position Acc, for easier understanding.

The map defining characteristic of required vehicle power P defines the characteristic that required vehicle power P decreases as the vehicle speed comes closer to the corresponding limit vehicle speed VLIM(HI) or VLIM (LO). When the vehicle speed exceeds the corresponding limit vehicle speed VLIM(HI) or VLIM(LO), the required vehicle power P is set to "zero".

Limit vehicle speeds VLIM(HI) and VLIM(LO) are determined in consideration of, for example, tolerable rotation speed of second motor generator MG2, and particularly, VLIM(LO) when LO-side gear is selected is determined beforehand in consideration of transmission gear ratio of sub transmission mechanism 26 in LO-side gear stage.

In this manner, as the vehicle speed comes closer to the corresponding limit vehicle speed VLIM(HI) or VLIM(LO), the magnitude of required vehicle power P decreases and therefore, the output to be transmitted to driving wheels 38 decreases, curbing increase in vehicle speed.

Again referring to FIG. 3, hybrid control unit 52 further includes an equivalent conversion unit 222, a vehicle speed monitoring unit 220 and a logical sum (OR) unit 210.

Vehicle speed monitoring unit 220 compares the magnitude relation between vehicle speed V and the limit vehicle speed #VLIM calculated at equivalent conversion unit 222, and if the vehicle speed V exceeds limit vehicle speed #VLIM, outputs a vehicle speed limit request to logical sum unit 210. Here, using the limit vehicle speed VLIM(HI) determined within the range of tolerable rotation speed of second motor generator MG2 in the state in which HI-side gear stage is set in sub transmission unit 26 (transmission gear ratio "1") as a reference, equivalent converting unit 222 converts equivalent limit vehicle speed #VLIM corresponding to the gear stage selected in sub transmission mechanism 26. Specifically, when HI-side gear stage is being selected in sub transmission mechanism 26, equivalent converting unit 222 outputs the limit vehicle speed VLIM(HI) directly as the limit vehicle speed #VLIM, and when LO-side gear stage is being selected in sub transmission mechanism 26, it divides the limit vehicle speed VLIM(HI) by the transmission gear ratio corresponding to the LO-side gear stage, and outputs the resulting value as the limit vehicle speed #VLIM. The operation process by equivalent converting unit 222 is switched in accordance with the selection state signal MOD.

In this manner, vehicle speed monitoring unit 220 monitors the speed so that tolerable rotation speed of second motor generator MG2 is not exceeded.

Further, hybrid control unit 52 further includes a temperature monitoring unit 230. Temperature monitoring unit 230 monitors temperatures of first motor generator MG1, second motor generator MG2, power control unit 62, main transmission mechanism 20, and sub transmission mechanism 26, not to exceed respective corresponding upper limit temperatures. More specifically, temperature monitoring unit 230 includes a temperature comparing unit 232 monitoring temperature T1 of stator 11s of first motor generator MG1, a temperature comparing unit 234 monitoring temperature T2 of stator 12s of second motor generator MG2, temperature comparing unit 236 monitoring temperature T3 of power control unit 62, a temperature comparing unit 238 monitoring temperature T4 of ATF in main transmission mechanism 20, and a temperature comparing unit 240 monitoring temperature T5 of ATF in sub transmission mechanism 26.

Temperature comparing units 232, 234, 236, 238 and 240 compare magnitude relation between temperatures T1, T2, T3, T4 and T5 and corresponding, predetermined threshold values Th1, Th2, Th3, Th4 and Th5, respectively, and if any of temperatures T1, T2, T3, T4 and T5 exceeds the corresponding threshold values Th1, Th2, Th3, Th4 and Th5, output a vehicle speed limit request to logical sum unit 210. Threshold values Th1, Th2 and Th3 are determined experimentally or empirically, considering insulation strength of rotor coils, insulation strength of semiconductor switching element and the like. Further, threshold values Th4 and Th5 of ATF temperatures are determined experimentally or empirically, considering temperature characteristics of respective ATFs.

Logical sum unit 210 performs logical sum (OR) operation and combines the vehicle speed limit requests output from vehicle speed monitoring unit 220 and temperature monitoring unit 230 (temperature comparing units 232, 234, 236, 238, 240), and outputs the result to distributing unit 200.

When the vehicle speed limit request is applied, distributing unit 200 reduces at least one of driving torque generated by engine 8 and second motor generator MG2, to prevent increase of vehicle speed. Further, in place of or in addition to the operation of reducing driving torque generated by engine 8 and/or second motor generator MG2, distributing unit 200 may reduce the output (power) of engine 8.

As shown in FIG. 4, required vehicle power P may be gradually reduced as the temperatures T1, T2, T3, T4 and T5 come closer to respective threshold values Th1, Th2, Th3, Th4 and Th5.

Figure 5:
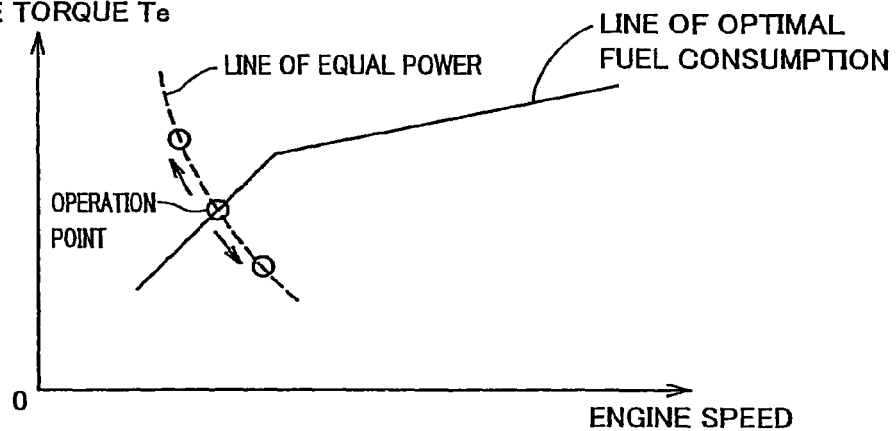
FIG. 5 illustrates an exemplary method of changing driving torque generated by the engine.

Referring to FIG. 5, distributing unit 200 stores an optimal fuel consumption line of engine 8, defining engine torque Te that attains maximum fuel consumption efficiency in correspondence with engine speed. Distributing unit 200 sets an intersecting point of the output (power) to be generated by engine 8 and the optimal fuel consumption line as the operation point of engine 8, and determines the engine speed corresponding to the operation point to be the engine speed target value Ne*. Therefore, under normal control operation, operation point of engine 8 may be set on any position of the optimal fuel consumption line.

Here, in order to change the torque generated by engine 8, distributing unit 200 shifts the operation point to the lower or upper side of optimal fuel consumption line along the line of equal power, which corresponds to the operation point at that time point. The direction of shifting the operation point (whether it should be shifted upward or downward) is determined dependent on the temperature states of first and second motor generators MG1 and MG2. Typically, when first motor generator MG1 operates as a generator and second motor generator MG2 operates as an electric motor and the temperature T1 of first motor generator MG1 is close to the upper limit temperature, it is preferred to shift the operation point downward, that is, in the direction to reduce the engine torque Te. When the temperature T2 of second motor generator MG2 is close to the upper limit temperature, it is preferred to shift the operation point upward, that is, in the direction to increase engine torque Te. In this manner, by shifting the operation point along the line of equal power, it is possible to reduce driving torque of engine 8 while satisfying the required vehicle power P determined in accordance with the state of travel, that is, while maintaining the power balance in power unit 2.

Figure 6:
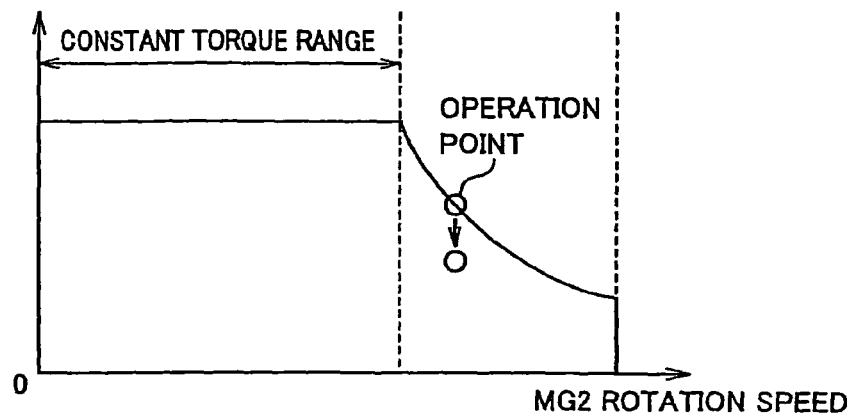
FIG. 6 illustrates an exemplary method of reducing driving torque generated by a second motor generator.

Referring to FIG. 6, distributing unit 200 maintains the torque of MG2 constant if the speed of rotation of second motor generator MG2 is relatively low (constant torque range), and it increases/decreases the torque of MG2 in accordance with the increase in rotation speed, if the speed of rotation of second motor generator MG2 is relatively high. Here, the constant torque range refers to the range up to the point at which the output generated by second motor generator MG2 (power=torque of MG2×rotation speed of MG2) exceeds rated output. Specifically, by the normal control operation, it follows that the operation point of second motor generator MG2 comes to be set on any position on the characteristic line shown in FIG. 6.

Here, in order to decrease the driving torque generated by second motor generator MG2, distributing unit 200 shifts the operation point at that time point in the direction to reduce the torque of MG2. By way of example, if the operation point of second motor generator MG2 is on the characteristic line shown in FIG. 6, the operation point is shifted downward while rotation speed is kept the same.

Further, by decreasing the driving torque generated by second motor generator MG2, magnitude of current supplied from power control unit (PCU) 62 to stator 12s can be curbed. As the current is regulated in this manner, heat generated by copper loss can be reduced.

Further, distributing unit 200 similarly reduces reactive force torque (generation power) of first motor generator MG1.

By such an operation, the amount of heat from stators 11s and 12s and from power control unit 62 can be reduced and, therefore, motor generators MG1 and MG2 and power control unit 62 can be protected from the viewpoint of heat load.

Execution of the vehicle speed limiting operation is not limited to when the LO-side gear stage is selected in sub transmission mechanism 26, and similar vehicle speed limiting operation may be executed when the HI-side gear is selected.

(Alarm Light Indication)

Hybrid control unit 52 further provides, when a state in which vehicle speed is close to the limit vehicle speed continues, an alarm indication to the driver by turning on an alarm light 64 (FIG. 1).

Figure 7:
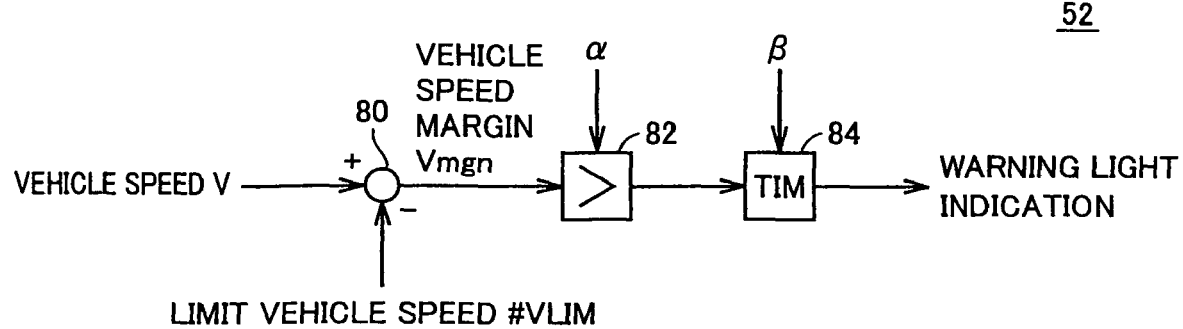
FIG. 7 is a functional block diagram for implementing a warning light indication.

Referring to FIG. 7, hybrid control unit 52 includes, as a control structure for providing alarm indication to the driver, a deviation calculating unit 80, a comparing unit 82, and a timer unit 84.

Deviation calculating unit 80 subtracts, from the vehicle speed V detected by rotation speed sensor 30 (FIG. 1), the limit vehicle speed #VLIM calculated by equivalent converting unit 222 (FIG. 3), to calculate vehicle speed margin Vmgn. Here, the vehicle speed margin Vmgn represents margin of vehicle speed V at each time point to the limit vehicle speed #VLIM. Comparing unit 82 compares magnitude relation between limit vehicle speed #VLIM and a predetermined threshold value α and, when the limit vehicle speed #VLIM attains to the threshold value α or lower, timer unit 84 is activated.

Timer unit 84 integrates time while it is activated by comparing unit 82. When the integrated time exceeds a predetermined threshold period β, timer unit 84 turns on the alarm light 64.

Specifically, when the state in which vehicle speed V is within the range of threshold α from limit vehicle speed #VLIM continues for the threshold period β, hybrid control unit 52 turns on the alarm light 64, so as to urge the driver to switch to the HI-side gear stage. This notifies the driver of forgotten switching of sub transmission mechanism 26, and wasteful fuel consumption caused by traveling in LO-side gear stage for a long time can be prevented.

(Process Flow)

The vehicle speed limiting operation in accordance with the present embodiment described above is summarized by the process steps shown in FIG. 8.

FIG. 8 is a flowchart showing process steps of the vehicle speed limiting operation in accordance with the present embodiment. The process shown in FIG. 8 is typically implemented by engine control unit 58, transmission control unit 54 and hybrid control unit 52 executing a program. The process shown in FIG. 8 is implemented as a subroutine program repeatedly executed in a prescribed period (for example, 100 msec) while IG (ignition) is on.

Referring to FIG. 8, at step S100, hybrid control unit 42 obtains the gear stage that is being selected in sub transmission mechanism 26. At the next step S 102, in accordance with the gear stage selected in sub transmission mechanism 26, hybrid control unit 52 calculates limit vehicle speed #VLIM. Then, at step S104, hybrid control unit 52 obtains vehicle speed V detected by rotation speed sensor 30. Then, at step S106, hybrid control unit 52 determines whether vehicle speed V has exceeded limit vehicle speed #VLIM or not.

If vehicle speed V has not exceeded the limit vehicle speed #VLIM (NO at step S106), the process proceeds to step S 08 and hybrid control unit 52 determines whether temperatures T1, T2, T3, T4 and T5 detected by temperature sensors 11$t$, 12$t$, 62$t$, 20$t$, and 26$t$ have exceeded corresponding upper limit temperatures or not.

If none of the temperatures T1, T2, T3, T4 and T5 exceeds the corresponding upper limit temperatures (NO at step S 108), the process proceeds to step S110, and hybrid control unit 52 determines engine speed target value Ne*, MG1 generation target value Pm1* and MG2 torque target value Tm2* in accordance with the normal control operation.

In contrast, if the vehicle speed V has exceeded limit vehicle speed #VLIM (YES at step S106), or if any of temperatures T1, T2, T3, T4 and T5 has exceeded the corresponding upper limit temperature (YES at step SI 08), the process proceeds to step S112 and hybrid control unit 52 executes the vehicle speed limiting operation. Here, the vehicle speed limiting operation includes (1) reduction of the output generated by engine 8, (2) reduction of driving torque generated by engine 8, (3) reduction of driving torque generated by second motor generator MG2, and (4) reduction of required vehicle power P. Hybrid control unit 52 executes at least one of the reduction operations. In accordance with such vehicle speed limiting operation, hybrid control unit 52 determines engine speed target value Ne*, MG1 generation target value Pm1*, and MG2 torque target value Tm2*.

After the completion of process step S110 or S112, the process proceeds to step S114, at which engine control unit 58 and power control unit 62 control operations of engine 8, first motor generator MG1 and second motor generator MG2, in accordance with engine speed target value Ne*, MG1 generation target value Pm1*, and MG2 torque target value Tm2* determined at step S110 or S112.

Thereafter, the process returns to step S100.

As to the correspondence between the embodiment and the present invention, engine 8 corresponds to the "power source", first motor generator MG1 corresponds to the "generator", first planetary gear mechanism 10 corresponds to the "power distributing mechanism", sub transmission mechanism 26 corresponds to the "first transmission mechanism", second motor generator MG2 corresponds to the "electric motor", and main transmission mechanism 20 corresponds to the "second transmission mechanism." Rotation speed sensor 30 corresponds to the "vehicle speed obtaining unit", temperature sensor 12$t$ corresponds to the "temperature obtaining unit", controller 50 corresponds to the "controller" and alarm light 64 corresponds to the "alarm light."

In the embodiment above, a configuration in which the output shaft of second motor generator MG2 is coupled to rotation output shaft 14 has been described as an example. A configuration in which the output shaft of second motor generator MG2 is coupled to intermediate rotation shaft 21 may be adopted. Specifically, the present invention is applicable to a configuration in which a member providing with continuously variable transmission such as second motor generator MG2 is arranged on the side closer to the power source than sub transmission mechanism 26 in the power transmission path from engine 8 as the power source to driving wheels 38.

According to the embodiment of the present invention, when the sub transmission mechanism 26 is switched to the LO-side gear stage, control operation is executed such that the vehicle speed does not exceed a predetermined limit vehicle speed in accordance with the transmission gear ratio of the LO-side gear stage. Therefore, excessive increase of rotation speed in second motor generator MG2 connected to the power transmission path between main transmission mechanism 20 and first planetary gear mechanism 10 as the power distributing mechanism can be prevented. Further, amount of heat generated by second motor generator and power control unit 62 can be reduced, preventing excessive heat build-up in these components.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid driving apparatus, comprising:
   a power source;
   a generator;
   a power distributing mechanism distributing at least a part of power from said power source to said generator and distributing remaining part to a rotation output shaft; and
   a first transmission mechanism arranged in a power transmission path from said rotation output shaft to driving wheels, said first transmission mechanism being capable of selecting a normal transmission stage used for normal traveling and at least one low-speed side transmission stage set to a transmission gear ratio larger than said normal transmission stage, in accordance with a driver's operation;
   an electric motor connected to said power transmission path between said power distributing mechanism and said first transmission mechanism, generating driving force using electric power;
   a vehicle speed obtaining unit; and
   a controller controlling operations of said power source, said generator and said electric motor; wherein
   when said low-speed side transmission stage is selected in said first transmission mechanism, said controller executes a control operation such that the vehicle speed does not exceed a limit vehicle speed determined in advance in correspondence with transmission gear ratio of said low-speed side transmission stage.

2. The hybrid driving apparatus according to claim 1, wherein
   said limit vehicle speed is determined based on tolerable rotation speed of said electric motor.

3. The hybrid driving apparatus according to claim 1, wherein
   said controller compares magnitude relation between the vehicle speed and said limit vehicle speed and when vehicle speed exceeds said limit vehicle speed, reduces at least one of driving torque generated by said electric motor and said power source.

4. The hybrid driving apparatus according to claim 1, further comprising:
   a temperature obtaining unit obtaining temperature of said electric motor; wherein
   said controller compares magnitude relation between the temperature of said electric motor and a predetermined threshold value, and when temperature of said electric motor exceeds said threshold value, reduces at least one of driving torque generated by said electric motor and said power source.

5. The hybrid driving apparatus according to claim 1, wherein
said controller determines a required output value to be transmitted to said driving wheels at least in accordance with vehicle speed, and determines operation target value of each of said power source, said generator and said electric motor in accordance with the required output value; and
magnitude of said required output value decreases as the vehicle speed comes closer to said limit vehicle speed.

6. The hybrid driving apparatus according to claim 1, wherein
said controller determines a required output value to be transmitted to said driving wheels at least in accordance with vehicle speed, and determines operation target value of each of said power source, said generator and said electric motor in accordance with the required output value; and
magnitude of said required output value decreases as a temperature of said electric motor comes closer to a predetermined threshold value.

7. The hybrid driving apparatus according to claim 1, further comprising
a second transmission mechanism having a plurality of transmission stages, arranged in the power transmission path from said rotation output shaft to said first transmission mechanism.

8. The hybrid driving apparatus according to claim 1, further comprising
a warning light for providing a warning indication to the driver; wherein
when a state in which the vehicle speed is close to said limit vehicle speed continues, said controller turns on said warning light 9. A method of controlling a hybrid driving apparatus, said hybrid driving apparatus including
a power source,
a generator,
a power distributing mechanism distributing at least a part of power from said power source to said generator and distributing remaining part to a rotation output shaft,
a first transmission mechanism arranged in a power transmission path from said rotation output shaft to driving wheels, and
an electric motor connected to said power transmission path between said power distributing mechanism and said first transmission mechanism, generating driving force using electric power,
said first transmission mechanism being capable of selecting a normal transmission stage used for normal traveling and at least one low-speed side transmission stage set to a transmission gear ratio larger that said normal transmission stage, in accordance with a driver's operation;
said control method comprising the steps of:
obtaining vehicle speed; and
when said low-speed side transmission stage is selected in said first transmission mechanism, controlling operations of said power source, said generator and said electric motor such that the vehicle speed does not exceed a limit vehicle speed determined in advance in correspondence with transmission gear ratio of said low-speed side transmission stage.

* * * * *